United States Patent [19]
Ganley

[11] 4,178,902
[45] Dec. 18, 1979

[54] ROTARY ENGINE

[76] Inventor: Thomas Ganley, 46-08 195th St., Flushing, N.Y. 11358

[21] Appl. No.: 634,843

[22] Filed: Nov. 24, 1975

[51] Int. Cl.² ............................................ F02B 53/00
[52] U.S. Cl. ................................................ 123/231
[58] Field of Search ...................... 123/8.31, 231, 222; 60/39.61

[56] References Cited

U.S. PATENT DOCUMENTS

| 932,463 | 8/1909 | Goyette | 60/39.61 X |
|---|---|---|---|
| 1,016,764 | 2/1912 | Noyes | 123/8.31 |
| 1,302,504 | 5/1919 | Briggs | 123/8.31 |
| 1,933,442 | 10/1933 | Maxwell | 60/39.61 X |
| 2,403,684 | 7/1946 | Rich | 60/39.61 |
| 2,468,451 | 4/1949 | Kutzner | 123/8.31 X |
| 3,745,979 | 7/1973 | Williams | 123/8.31 X |

FOREIGN PATENT DOCUMENTS

| 569615 | 1/1924 | France | 123/8.31 |
|---|---|---|---|
| 19252 | of 1914 | United Kingdom | 123/8.31 |
| 134073 | of 1919 | United Kingdom | 123/8.31 |
| 291119 | 5/1928 | United Kingdom | 123/8.31 |
| 323753 | 1/1930 | United Kingdom | 123/8.31 |

Primary Examiner—Michael Koczo

[57] ABSTRACT

A rotor mounted in a housing forms a first compression chamber and a second expansion chamber with the housing. A third collection chamber formed in the housing between the first and second chambers collects compressed fluid or gas from the first chamber and feeds it to the second chamber for ignition. The rotor has three equi-angularly spaced wiper arms mounted on the circumference for engaging with the inner surface of the housing, and forces the gas into the collection chamber, and receives the impact of the force released by the ignition of the gas or fluid to thereby drive the rotor and a mainshaft attached to the rotor.

8 Claims, 3 Drawing Figures

ROTARY ENGINE

BACKGROUND OF THE INVENTION

The present invention relates to a rotary engine, and more particularly to a rotary engine in which measured amounts of a combustible fluid are expanded and directed through the engine rotor so as to develop the thrust to drive the engine.

In copending application Ser. No. 463,132 filed Apr. 22, 1974, and now U.S. Pat. No. 4,028,885 the applicant has set out a rotary engine in which a main drive rotor drives a main drive shaft via a pair of compressors supplying compressed combustible fluid to the rotor. The pair of compressors, rotatably mounted about the main drive shaft, feed the compressed fluid to the rotor through a feed mechanism that controls the amount of compressed combustible fluid flowing to an ignition chamber, from which it is fed to a plurality of parallel bores formed through the body of the main drive rotor in order to cause the rotation thereof. The parallel bores are situated in the rotor such that they extend angularly in the direction of the rotation of the rotor and main drive shaft, the fluids contained in the parallel bores being exhausted through exhaust bores and pipes communicating with the parallel bores once every rotation of the rotor and drive shaft.

SUMMARY OF THE INVENTION

It is the primary object of the present invention to provide a rotary engine in which the compressors and rotors disclosed in copending application Ser. No. 463,132 filed Apr. 22, 1974, and now U.S. Pat. No. 4,028,885 are combined into one rotor-compressor, thereby eliminating the need of supplying two compressors and a separate rotor, and concomitantly simplifying the structure and operation of the rotary engine.

According to the preferred embodiment of the present invention, the rotary engine has a main drive rotor which in addition to reacting to the expansion of an ignited compressed fluid, compresses that fluid in one single operation. The rotor is fixedly connected to the main drive shaft and has a compression chamber, a collection chamber for the compressed fluid, and an expansion chamber in which the collected compressed fluid is ignited and expanded to drive the rotor and main drive shaft. Providing on the circumference of the rotor are three wippers that rotate along with the rotor and perform the function of compressing the fluid in the compression chamber and forcing the ignited and expanded fluid out of the expansion chamber through an exhaust port. The compressed fluid in the compression chamber is separated from amd transferred to the expansion chamber by a feed mechanism mounted in the collection chamber. The feed mechanism is made up of a rotating hollow feed pin having a plurality of circumferential holes formed therein into aligned series where the outside holes of each series receives compressed fluid from the collection chamber and the inner hole or holes feed the collected fluid to the expansion chamber for subsequent ignition. The feed pin is rotated in conjunction with the main drive shaft and is connected therewith via a gear train.

BRIEF DESCRIPTION OF THE DRAWINGS

The invention will be more readily understood with reference to the following detailed description when taken in conjunction with reference to the accompanying drawings, in which.

DETAILED DESCRIPTION OF THE INVENTION

Figure 1:
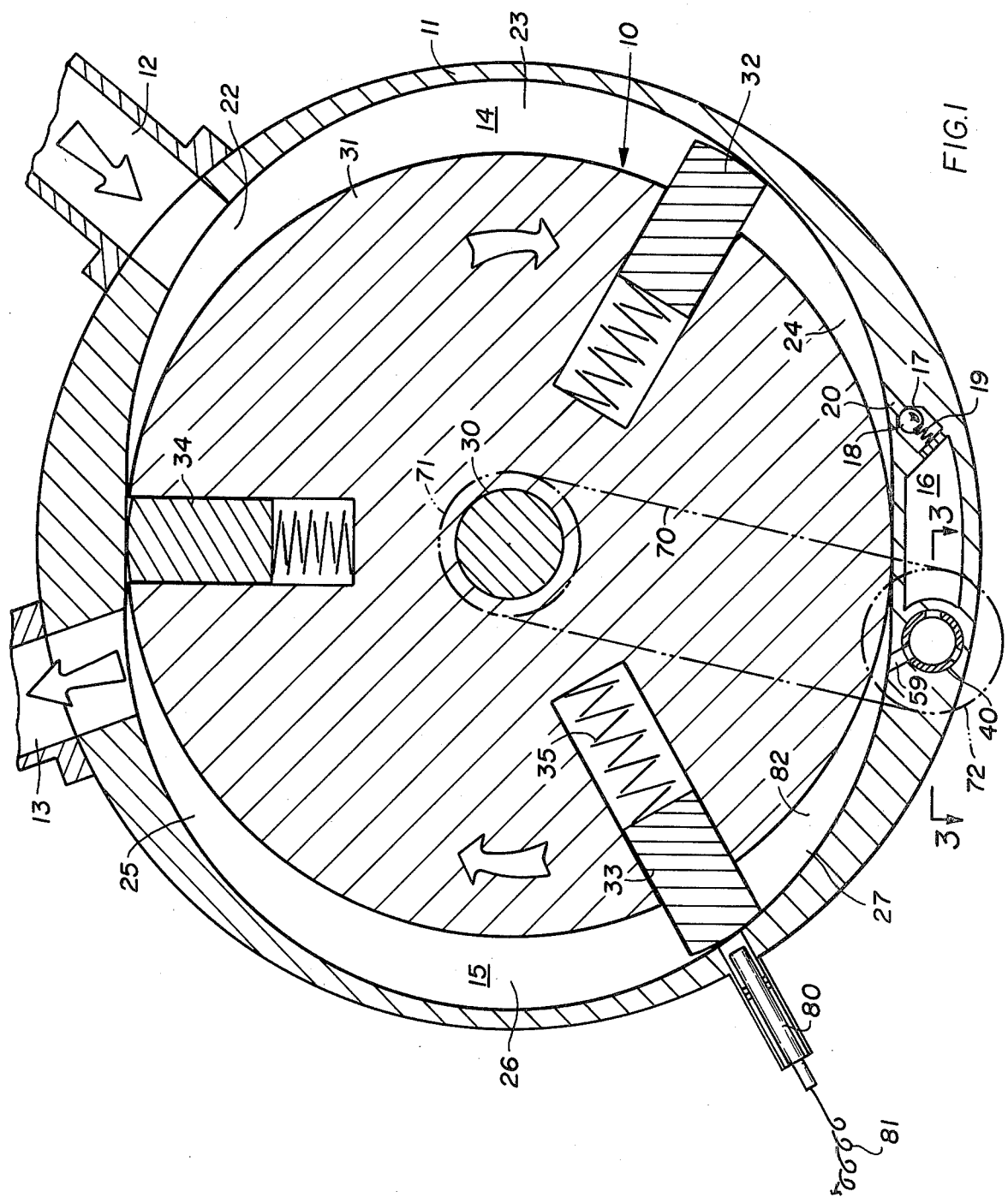
FIG. 1 is an end view, partially in section, of the main drive rotor of the present invention.

Referring now to FIG. 1, there is shown the main drive rotor 10 of the present invention. The rotor 10 is received in a casing or housing 11 in which is formed an inlet port 12 and outlet port 13. The ports 12 and 13 are spaced angularly about the circumference of the casing 11 so that each defines a boundary of the compression and expansion chambers, respectively (to be described). The inlet port 12 receives combustible fluid or gas from any conventional carburetor or may alternatively receive the fluid or gas via fuel injection. The casing 11 forms a chamber therein in which is received the rotor 10 and which forms in the annular spaces therebetween a compression chamber 14, and an expansion chamber 15, the two chambers being separated by the rotor contacting the casing 11 therebetween. Between the two chambers 14 and 15 is a collection chamber 16 formed in the casing 11 itself and closed off to the chamber 14 by a ball check valve 17 having a ball 18 biased outwardly toward the chamber 14 by a spring 19. The ball check valve is mounted in a channel 20 forming the entrance to the collection chamber 16 for the fluid compressed in the chamber 14. The ball check valve serves to control the amount of compressed fluid entering the chamber 16 and to prevent the exit thereof through the channel 20.

As can be seen in FIG. 1, the compression chamber 14 and the expansion chamber 15 each extend around the rotor 10 by about 180 degrees, and are shaped similarly, but in mirror image to each other. The compression chamber 14 has an initial portion 22 in the vicinity of the inlet port 12 of narrow width as measured by the distance from the circumference of the rotor 10 to the inner circumference of the casing 11, and progressively widens to a maximum width portion 23, from which it progressively narrows to a narrow portion 24 in the vicinity of the collection chamber 16. The expansion chamber similarly has an initial portion 25 in the vicinity of the outlet port 13 of narrow width and progressively widens to a maximum width portion 26 diametrically opposite to the maximum width portion 23 of the compression chamber 14, and then progressively narrows to a narrow portion 27 in the vicinity of the collection chamber 16.

The rotor 10 is connected to a main drive shaft 30 to which is connected the power train of a vehicle or the like in order to drive a load. Main drive shaft 30 is suitably journalled in ball or roller bearings (not shown) at its ends for rotation with the rotor 10. The rotor 10 consists of a plurality, preferably four, (only one being shown) circular plates 31 joined together as by welding to form a complete rotatable unit. Mounted within the plates 31 are three wipers disclosed in applicant's copending application Ser. No. 463,132, now U.S. Pat. No. 4,028,885. The wipers each have a spring 25 biasing them toward the inner circumference of the casing 11 so that they always bear against the inner circumference of the casing 11. It is noted that the inlet and outlet openings 12 and 13 are each of a width that is less than the width of each wiper so that when the wipers pass by the ports they will still be in contact with the inner circumference of the casing 11. It can, therefore, be seen that gas or fluid supplied through inlet port 12 will be compressed by a wiper rotating with the rotor 10 in the compression chamber chamber 10 and will be forced into the collection chamber 16 by the same wiper. It can also be seen that the compressed gas or fluid contained in the collection chamber 16 will be supplied to the expansion chamber 15 by a feed mechanism 40 (to be described below) where it is expanded upon ignition and will drive the same or another wiper to thereby rotate the rotor 10. Also the wiper driven by the ignited gases will also serve to expel the ignited gases in front of it through the outlet port 13 as the rotor rotates with the shaft 30. The wipers 32, 33 and 34 are spaced 120 degrees apart as measured along the circumference of the rotor 10 so that at any moment in time there will be a wiper in the compression chamber 14 and a wiper in the expansion chamber 15.

Figure 2:
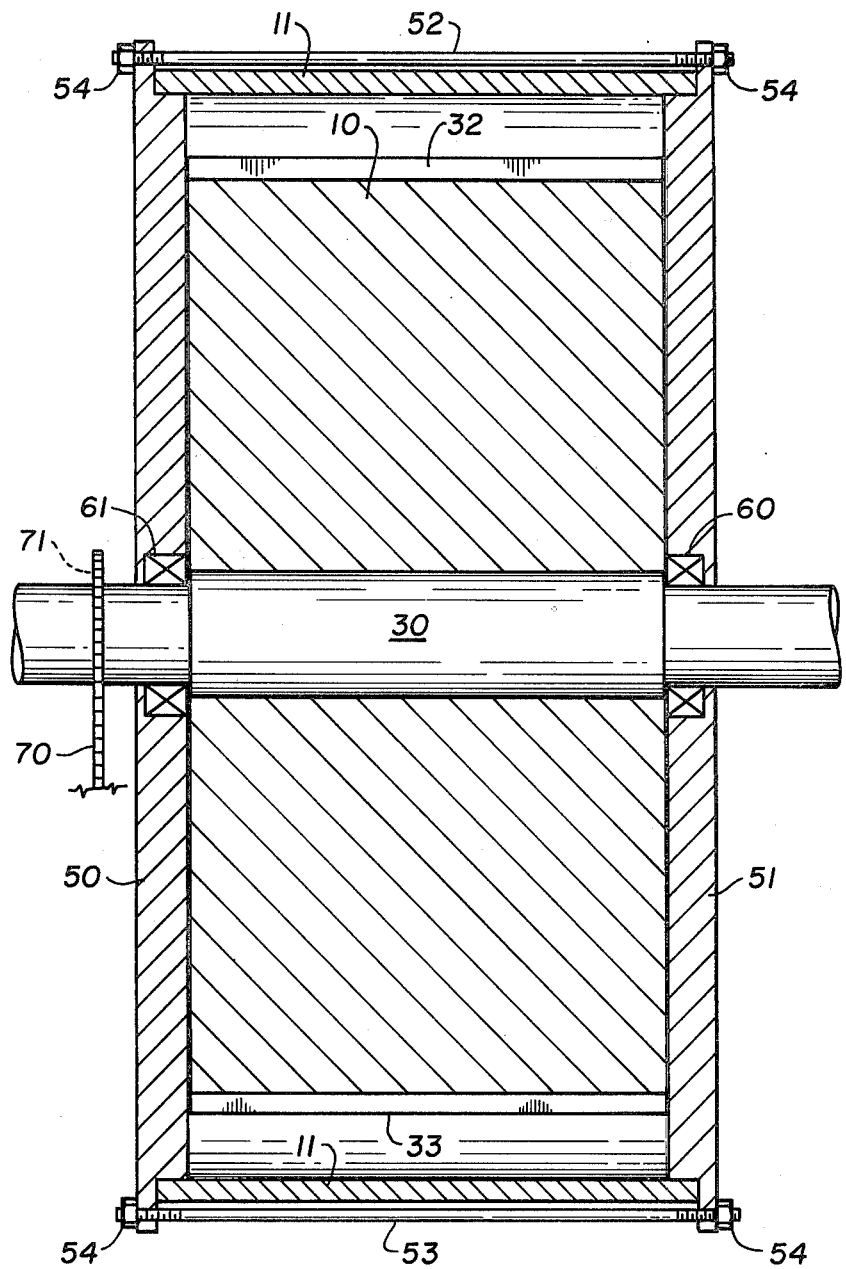
FIG. 2 is a side view of the end plates mounting the rotor of the present invention.
Figure 3:
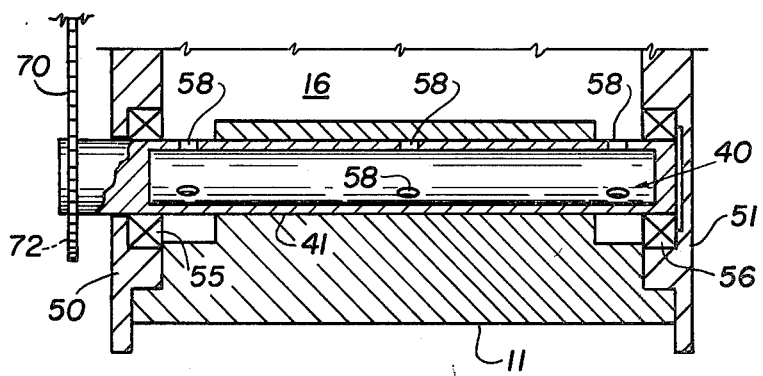
FIG. 3 is a cross-sectional view taken along line 3—3 of FIG. 1.

The feed mechanism 40 which transfers the compressed gas or fluid to the expansion chamber is best shown in FIG. 3. A hollow pin 41 is rotatably mounted in the casing 11 and between a pair of plates 50, 51 best seen in FIG. 2. The plates 50, 51 are similar in function to those disclosed in applicant's copending application, Ser. No. 463,132, and sandwich the rotor 10 therebetween. Tie rods 53, 53 connect the plates together, and are made adjustable by lock nuts 54 threaded on the outer portions of the tie rods. The main drive shaft 30 is journalled in the plates by the main ball bearings 60, 61.

Turning back to FIG. 3, the feed pin 41 is rotatably journalled in the plates 50, 51 by bearings 55, 56 and has a plurality of openings 58. As shown in FIG. 3, the feed pin has three openings 58 forming a series, there being provided three or more series around the circumference of the pin. The openings 58 in any one series are in alighment with each other along the axial direction of the feed pin, and have two outside openings and one inner opening. The outer openings 58 cooperate with the interior of the collection chamber 16 as can be seen in FIG. 3, while the inner opening cooperates with a channel 59 (see FIG. 1) formed in the casing 11 which connects the interior of the feed pin 41 with the expansion chamber 15. The hollow feed pin 41 is rotatably driven off the main drive shaft 30 by a chain 70 connecting gears 71 and 72 mounted on the ends of the main drive shaft 30 and feed pin 41, respectively. It can, therefore, be seen that as the collected compressed gas or fluid is stored in the collection chamber 16, the feed pin 41 will rotate in timed relation with the main drive shaft and collect compressed gas in the interior hollow part thereof by the outer openings 58 of the individual series of openings. The pressure differential between the collection chamber 16 and the expansion chamber 15 will cause the collected gas in the hollow interior of the feed pin to exit via the inner opening 58 of each series every time the inner openings align with the channel 59.

It is preferred that three series of openings be provided about the circumference of the feed pin, each series containing three openings: two outer feeder openings, and one inner feeder opening. However, it is to be understood that other combinations of series and openings could be provided as long as adequate flow of compressed fluid is supplied to the expansion chamber. In the present embodiment, the three series of openings are equi-angularly spaced about the circumference of the feed pin thereby being spaced about 120 degrees from each other.

The compressed fluid or gas supplied by feed pin 41 to the expansion chamber 15 is ignited by glow plug 80 of conventional design and which is often found in motorcycles and model airplanes. The glow plug 80 mounted in a groove in the casing 11, has an electric feed 81 connecting to a source of power, such as a vehicle battery so as to glow continuously. Therefore, as the compressed fluid passes by the glow plug 80, it is ignited and expanded to thereby cause the rotation of the rotor 10 via one of the wipers 32, 33, 34.

The rotor 10 is typically 12 inches in diameter and consists of 4 one-inch wide plates, the main drive shaft 30 is typically 1¼ inches in diameter, the feed pin is typically 1 inch in diameter, while the wipers are 4 inches wide, 2 inches long, and 1 inch deep. The capacity of the engine is approximately 70 cubic inches.

In operation, gas or fluid is supplied to the inlet port 12 where the gas or fluid is compressed by a wiper rotating thereby and forces the gas into the collection chamber 16. The volume of the collection chamber 16 will determine the compression ratio of the engine since it serves to further compress the gas supplied from the chamber 14. The gas in the chamber 16 will be fed to the expansion chamber 15 through feed pin 41 and will be ignited in an ignition chamber 82 of the expansion chamber 15. The ignition chamber 82 is that part of the expansion chamber situated between the channel 59 from which gas enters and glow plug 80 where the gas is first ignited. The volume of the collection chamber 16 and the volume of the ignition chamber 82 are approximately equal to prevent any loss of compression in the gas or fluid. After the gas is ignited, the force released thereby will drive a wiper and rotate the rotor 10 and drive shaft 30. Simultaneous with the ignition of the gas, is further compression of the gas supplied by the inlet port 12 by another wiper so that a constant supply of collected gas is provided in the collection chamber 16. After the gas is ignited in the ignition chamber 82, another wiper, which previously compressed the gas supplied from the inlet port 12, will force the expanded and ignited gas out of the expansion chamber 15 and will simultaneously therewith form another supply of ignitable gas in the ignition chamber 82. The above process is therefore repeated continuously driving the rotor via the wipers. It is seen that since the feed pin 41 is directly connected to the main drive shaft 30, the rotation of the two are in timed relation so that the collected gas in the collection chamber 16 will be supplied to the ignition chamber 82 only right after one of the wipers has passed the channel 59. Typically, there is a one-to-one ratio between the gears 71 and 72.

The lubrication of the rotor may be attained by using the system disclosed in copending application Ser. No. 463,132, now U.S. Pat. No. 4,028,885, where the main drive shaft 30 has an axial extending channel receiving the lubricant from a reservoir, the axial channel cooperating with channels formed in the rotor plates leading to channels in the wipers 32, 33 and 34. The gears 70, 71 are self-lubricating gears, made of synthetic material designed to have a long life.

Although the invention has been described with a certain degree of particularity, it will be understood that the engine disclosed is merely a preferred embodiment of the invention, that persons skilled in the art will recognize that numerous changes in the details of construction and in the arrangement of parts may be resorted to without departing from the spirit and scope of the invention as hereinafter claimed.

What is claimed is:

1. A rotary engine comprising a generally cylindrical rotor housing, a generally cylindrical rotor mounted for rotation within said rotor housing about the central axis thereof, a first chamber formed between said rotor and said rotor housing for compressing a combustible fluid or gas supplied thereto, a second chamber formed between said rotor housing and said rotor for expanding the combustible gas compressed in said first chamber, said rotor housing having a third chamber formed entirely within the wall of said rotor housing between said first and second chambers and extending along the axial length thereof, inlet channel extending through said wall directly connecting said first chamber with said third chamber for the passage of compressed media, one way valve means in said inlet channel permitting communication from said first to thid chamber only, and an outlet channel axially offset from said inlet channel and directly connecting said third chamber with said second chamber, and feed means located in said outlet channel for permitting a portion of the gas collected in said third chamber to exit into said second chamber in timed relationship with the rotation of said rotor, said feed means comprising a rotatable hollow pin having a plurality of radial openings formed in the circumference thereof arranged in a plurality of series each series lying along a straight line on said circumference of said pin, each series having at least one first opening aligned with the third chamber and at least one second opening aligned with the outlet channel, whereby as each opening aligns respectively with the chamber and channel, the gas or fluid in said third chamber enters said pin through said first openings and collects therein and subsequently exits through said second openings of each series when said openings are in alignment with the respective channel, means for supplying the combustible gas or fluid to said first chamber, means for removing the gas or fluid from second chamber, said second chamber having igniting means mounted therein for igniting the compressed gas fed thereby by said third chamber, and a drive shaft connected to the center of said rotor for rotation therewith, whereby the gas compressed in said first chamber is forced into said third chamber and fed to said second chamber via said hollow pin for ignition therein to thereby drive said rotor and drive shaft.

2. The rotary engine according to claim 1, wherein said first chamber and said second chamber are separated from each other and lie on opposite sides of said rotor.

3. The rotary engine according to claim 2, including plurality of wipers extending radially from said rotor, each wiper having a main body portion in contact with said main housing, and a spring biasing said main body portion toward said main housing.

4. The rotary engine according to claim 2, wherein said first chamber and said second chamber lie on opposite sides of said rotor and are formed by the annular space between said rotor and said rotor housing, said first housing extending 180 degrees about said rotor and said second housing extending 180 degrees about said rotor.

5. The rotary engine according to claim 4, wherein each of said first and second chambers has a similarly designed shape, said shape having a first narrow portion, a second portion of maximum width, and a third narrow portion, said first and second chambers being separated from each other by a portion of said rotor circumference to prevent cooperation between the gases contained therein.

6. The rotary engine according to claim 1, further comprising a pair of mounting plates, said rotor being mounted between said pair of plates, said pair of plates rotatably mounting said drive shaft, and means for connecting said pair of mounting plates together for adjustable positioning thereof.

7. The rotary engine according to claim 3, wherein said plurality of radially extending means are spaced equi-angularly about the circumference of said rotor.

8. The rotary engine according to claim 3, wherein said wipers are spaced 120° apart along said circumference of said rotor.

* * * * *